Figure 4:
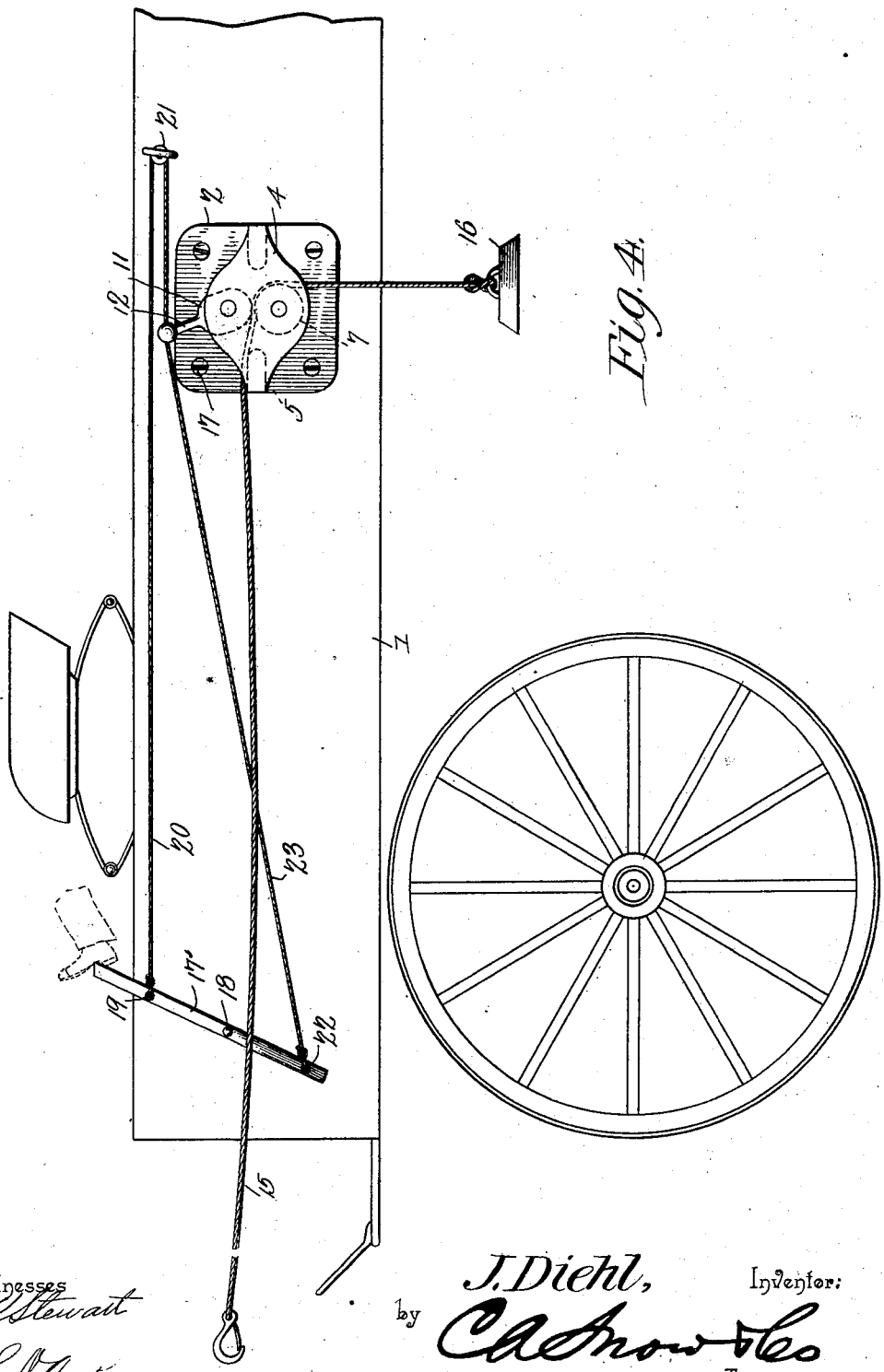

No. 739,483. PATENTED SEPT. 22, 1903.
J. DIEHL.
SUSPENSION DEVICE FOR HORSE WEIGHTS.
APPLICATION FILED JAN. 23, 1903.
NO MODEL. 2 SHEETS—SHEET 1.
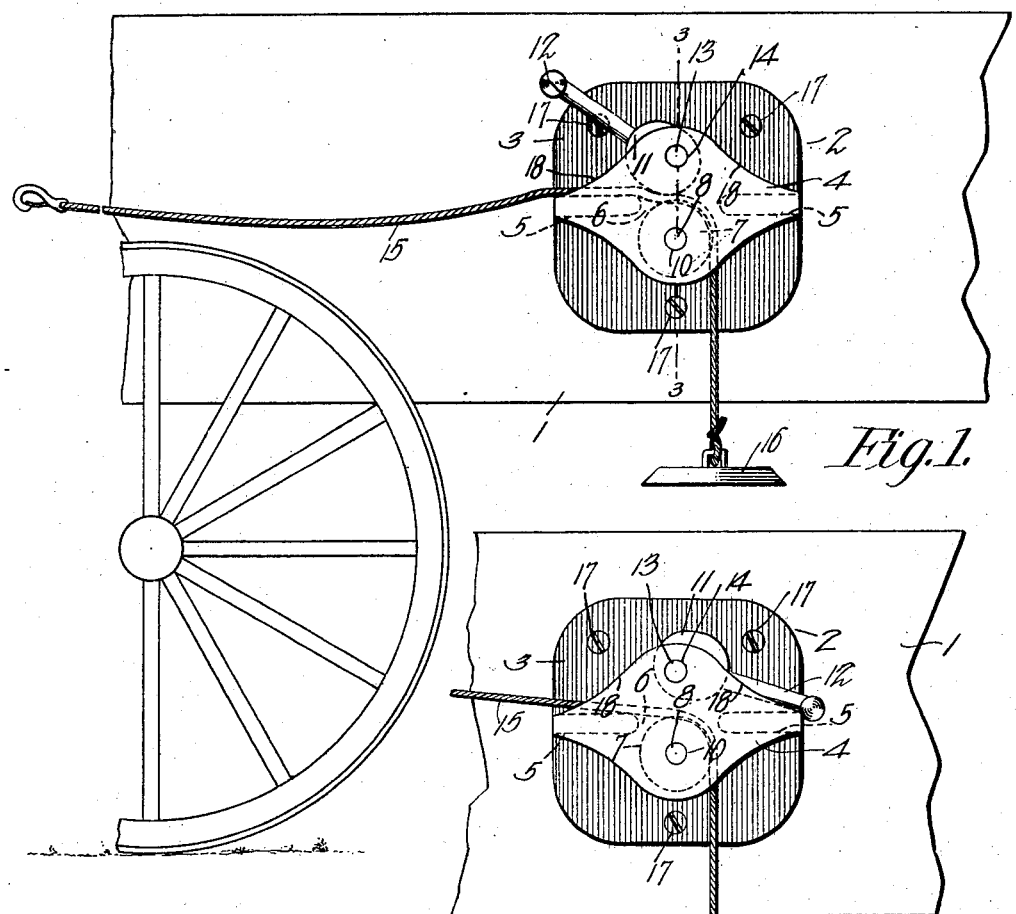
Fig.1.
Fig.2.
Fig.3.
Witnesses
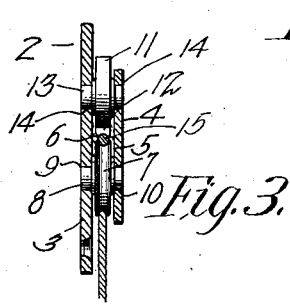
J. Diehl, Inventor:
by
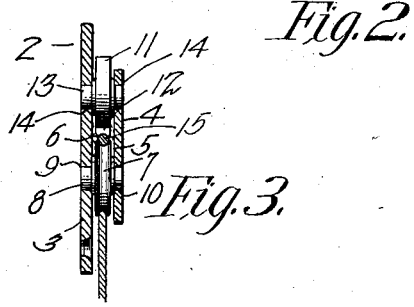
Attorneys No. 739,483. PATENTED SEPT. 22, 1903.
J. DIEHL.
SUSPENSION DEVICE FOR HORSE WEIGHTS.
APPLICATION FILED JAN. 23, 1903.
NO MODEL. 2 SHEETS—SHEET 2.

Witnesses
J. Diehl, Inventor:
by C. A. Snow & Co
Attorneys

No. 739,483. Patented September 22, 1903.

UNITED STATES PATENT OFFICE.

JACOB DIEHL, OF SHEBOYGAN, WISCONSIN, ASSIGNOR OF ONE-HALF TO GEORGE M. DIEHL, OF SHEBOYGAN, WISCONSIN.

SUSPENSION DEVICE FOR HORSE-WEIGHTS.

SPECIFICATION forming part of Letters Patent No. 739,483, dated September 22, 1903.

Application filed January 23, 1903. Serial No. 140,279. (No model.)

*To all whom it may concern:*

Be it known that I, JACOB DIEHL, a citizen of the United States, residing at Sheboygan, in the county of Shebogyan and State of Wisconsin, have invented a new and useful Suspension Device for Horse-Weights, of which the following is a specification.

This invention relates to a hitching device, and more particularly to that class in which a drop-weight is employed, and has for its object to provide a simple inexpensive device of the character adapted for application to the body of a wagon or other vehicle, whereby the necessity of carrying the horse-weight inside the vehicle-body and of lifting it therefrom when the horse is to be hitched is obviated and whereby the horse may be hitched before the driver leaves the vehicle and unhitched after the driver enters the vehicle, the whole being effected by simple means and in an expeditious manner.

A further object of the invention is to provide means for normally retaining the weight in the elevated position; but should the horse break a trace and attempt to run away the weight-retaining means will be automatically released and allow the weight to fall, pulling on the bit and checking the animal.

A further object of the invention is to so arrange the device as to permit of the return of the weight to elevated position without the employment of auxiliary cords or straps, the strap or other flexible connection between the draft-animal and the weight being maintained within convenient reach of the occupant of the vehicle.

The invention consists in the construction and novel combination and arrangement of parts hereinafter fully described, illustrated in the accompanying drawings, and pointed out in the claims hereto appended.

In the drawings, Figure 1 is a side elevation of the hitching device, showing it applied to a wagon. Fig. 2 is a side elevation showing the weight in the lowered position. Fig. 3 is a vertical section on the line 3 3 of Fig. 1. Fig. 4 is a side elevation of a modified form of hitching device, showing a foot-operated lever for throwing the cam into and out of contact with the weight-strap.

Similar numerals of reference indicate corresponding parts in all the figures of the drawings.

1 designates the vehicle, a wagon in the present instance, to one of the side-boards of which is attached the hitching device 2. The hitching device 2 consists of a casting formed of two parallel side plates 3 and 4, connected by integral spacing-blocks 5, defining a cavity or recess 6, in which is journaled a roller 7, loosely mounted on a pin 8, passing through coincident openings 9 and 10 in the side plates 3 and 4 and riveted or otherwise secured thereto opposite the roller 7, and in vertical alinement therewith is a cam 11, having a handle 12 and mounted on a pivot-pin 13, which extends through openings 14 in the side plates 3 and 4. The cam is disposed within the cavity 6 a sufficient distance from the roller 7 to admit the easy introduction of a strap, cord, or other flexible medium 15, which lies parallel with the side-board of the vehicle, one end thereof being fastened in any suitable manner to the bit or bridle of the animal and the other end passing over the roller 7 and provided with a weight 16. The side plate 4 has its end portion inclined or beveled, as shown at 18, which allows the cam to swing freely back and forth and into and out of contact with the strap 15 and roller 7. The hitching device may be attached to the side-board or other portion of the vehicle in any suitable manner, as by bolts 17 passing through the side plate 3.

From the foregoing description, taken in connection with the drawings, the operation of the hitching device will be readily understood. When driving, the weight is held in the elevated position by the pressure exerted on the strap 15 by the cam 11, and when it is desired to hitch the horse the driver throws the cam out of contact with the strap, allowing the weight to fall to the ground. When it is desired to unhitch the horse, the driver simply pulls on the strap without getting out of the vehicle and elevates the weight, and it may be held in the elevated position by throwing the cam in contact with the strap, as before stated. Should the horse break a trace and attempt to run away, the sudden jerk on the strap 15 will automatically release the eccentric, which allows the weight to drop, pulling on the bit and checking the animal.

In Fig. 4 of the drawings I have shown a modified form of hitching device in which a foot-operated lever is employed for throwing the cam into and out of contact with the weight-strap. In this case a foot-lever 17' is pivoted in any suitable manner, as by a bolt 18, to the side-board of the wagon, and fastened in an opening 19 in the upper end of the lever is a cord or other flexible medium 20, which extends rearwardly and parallel with the side-board, the end thereof being passed over a pulley 21, secured to the side-board and fastened to the handle 12 of the cam. The lower end of the lever 17' is also provided with an opening 22, adapted to receive one end of a cord or chain 23, the opposite end thereof being fastened to the cam, so that when the lever is thrown to the left it will throw the cam out of engagement with the strap, releasing the same and permitting the weight to drop. When it is desired to unhitch the horse, the driver simply pulls on the strap, which elevates the weight, and throws the lever to the right, causing the cam to engage the strap and lock the weight in the elevated position.

The lever 17' may be provided with a pair of outwardly-projecting pins for securing the cord instead of the openings 19, if desired, and the cord or other flexible medium may be formed in one continuous length passing through the handle of the cam and fastened to said pins.

By means of the foot-lever the hitching device may be attached to the vehicle-body at any portion thereof and the hitching and unhitching of the horse effected without getting out of the vehicle by simply operating the foot-lever.

Various changes in form, proportion, and minor details of construction may be resorted to without departing from the principles or sacrificing any of the advantages of the invention.

Having thus described the invention, what I claim is—

1. In a device of the class specified, a weighted strap or cord provided at one end with harness-attaching means, guiding means therefor, and mechanism coöperating with said guiding means for engaging the strap at a point intermediate of its length and maintaining the weight in elevated position.

2. In a device of the class specified, a strap or cord provided at one end with harness-attaching means and at the opposite end with a weight, a guiding means engaging the strap at a point intermediate of its length, and a cam movable to and from said guiding means to engage the strap and maintain the weight in elevated position.

3. The combination in a hitching device of a casting consisting of two parallel side plates connected by integral spacing-blocks, a roller journaled between said plates, a weighted strap passing over the roller and a cam journaled between the side plate and adapted to be thrown into and out of contact with the strap.

4. A hitching device comprising two parallel side plates, a roller journaled between the side plates, a strap passing over the roller and having one end provided with harness-attaching means, a weight secured to the opposite end of said strap, and means carried by the plate for holding the weight in a lowered or elevated position.

5. The combination with a vehicle, of a hitching device secured thereto and comprising two parallel side plates one of said plates having its end portions inclined or beveled, a roller journaled between said plates, a strap passing over the roller and provided with a weight, and a cam journaled between the side plates and adapted to be thrown into and out of contact with the strap.

In testimony that I claim the foregoing as my own I have hereto affixed my signature in the presence of two witnesses.

JACOB DIEHL.

Witnesses:
F. W. BROER,
F. H. DENISON.